Patented Nov. 3, 1953

2,658,030

UNITED STATES PATENT OFFICE 2,658,030

PROCESS FOR RECOVERING SULFURIC ACID FROM MIXTURES THEREOF WITH PYRIDINE MONOCARBOXYLIC ACID BISULFATES

Ralph W. Dornte, Abington, Pa., assignor to Allied Chemical & Dye Corporation, New York, N. Y., a corporation of New York No Drawing. Application November 16, 1951, Serial No. 256,839

15 Claims. (Cl. 202—40)

This invention relates to a process for recovering sulfuric acid from mixtures thereof with pyridine monocarboxylic acid bisulfates, and more particularly to the recovery of sulfuric acid and pyridine monocarboxylic acid bisulfates from pyridine monocarboxylic acid oxidation masses in the production of which sulfuric acid has been used as the oxidizing medium.

Pyridine monocarboxylic acids, such as nicotinic and isonicotinic acids, may advantageously be produced by the oxidation in a sulfuric acid-containing oxidizing medium, of N-heteroaryl compounds containing a single pyridine nucleus and having an oxidizable organic hydrocarbon grouping attached to the pyridine nucleus by one or more carbon-to-carbon linkages. Nicotinic acid, i. e. 3-pyridine carboxylic acid, may be produced from such N-heteroaryl compounds as have an oxidizable hydrocarbon grouping attached to the pyridine nucleus in a single beta or "3" position, no oxidizable substituent groups on the pyridine nucleus and not more than two additional oxidizable hydrocarbon substituents attached to the pyridine ring, each of which is in an alpha position, for example quinoline, quinaldine, 3-methyl pyridine, 2,3-dimethyl pyridine, 2,3,6-trimethyl pyridine, 5- and 8-hydroxyquinolines, 5- and 8-nitroquinolines and the like, when oxidized either with sulfuric acid alone or with nitric acid or other oxidizing agents in a sulfuric acid reaction medium, or with a mixed sulfuric acid-nitric acid oxidizing agent, in a substantially anhydrous medium, in each case using an excess of sulfuric acid over that consumed in oxidizing the N-heteroaryl compound to nicotinic acid. Isonicotinic acid, i. e. 4-pyridine carboxylic acid is produced, for example, by the oxidation of such compounds having substituents in the "4" position, e. g. 2,4-lutidine, 4-picoline, etc. Picolinic acid, i. e. 2-pyridine carboxylic acid, is produced by the oxidation of 2-picoline, etc. This acid, however, tends to decompose by decarboxylation at temperatures employed in sulfuric acid oxidations, and accordingly its production by such processes is not usually undertaken.

The products obtained from such oxidations are mixtures of the pyridine monocarboxylic acid with the excess sulfuric acid over that used and lost in the oxidation process, so that to recover the pyridine monocarboxylic acid in pure form it is necessary to separate it from the sulfuric acid. If nitric acid is used in the oxidizing medium, it is usually substantially completely eliminated during the oxidation process, either directly in oxidizing the N-heteroaryl compound or by decomposition to nitrogen oxides, so that very little, if any, nitric acid remains in the oxidation mass after completion of the oxidation reactions; consequently the oxidation masses in this case also are essentially solutions of pyridine monocarboxylic acid in concentrated sulfuric acid. In any case, the pyridine monocarboxylic acid is present in solution as the pyridine monocarboxylic acid bisulfate, an equimolecular association complex of sulfuric acid and pyridine monocarboxylic acid.

Recovery of pyridine carboxylic acids from concentrated sulfuric acid solutions has been carried out in the past by a number of methods; according to one prior art method, by drowning the oxidation mass in a large excess of water, for example quantities of the order of about 2 to about 3 volumes of water per volume of reaction mass, adding copper oxide or a copper salt to the resulting mass, neutralizing the mass to precipitate copper pyridine carboxylate, recovering the precipitated copper salt as by filtration, and regenerating the pyridine carboxylic acid from its copper salt.

This process, while satisfactory in many respects, is wasteful of sulfuric acid as it results in the formation of large quantities of dilute solutions of ammonium- or alkali metal sulfates from the drowning and neutralization of the oxidation mass, which presents a severe loss of sulfuric acid as well as a serious waste disposal problem if the dilute solution is discarded as it usually is in practice, since recovery of the sulfates themselves or of sulfuric acid values from such solutions is not economically practical. Moreover, when such oxidation masses contain a catalyst material such as, for example, selenium or a selenium compound, no recovery of such catalyst by the prior art recovery processes is undertaken.

The present invention provides a process which avoids the prior art difficulties in the recovery of the pyridine monocarboxylic acids nicotinic acid and isonicotinic acid.

A primary object of the present invention is to provide a process for recovering concentrated sulfuric acid from mixtures thereof with nicotinic or isonicotinic acid bisulfates.

A further obect is to provide such a process in which sulfuric acid is recovered from nicotinic or isonicotinic acid oxidation masses prior to or concurrently with the recovery of nicotinic or isonicotinic acid bisulfate, and without significant decomposition or loss of nicotinic or isonicotinic acid.

Another object of the invention is to provide for the recovery of concentrated sulfuric acid from such oxidation masses without dilution thereof with water.

A still further object of the invention is to provide a process for recovering selenium catalyst values from nicotinic or isonicotinic acid oxidation masses containing this material.

These and other objects are accomplished according to my invention wherein solutions of nicotinic or isonicotinic acid bisulfates in quantities of concentrated sulfuric acid in excess of that necessary to combine with the pyridine monocarboxylic acid to form the bisulfate, are subjected to distillation to effect virtually complete volatilization and recovery of the free sulfuric acid values in such solutions, and to leave as residue substantially quantitative yields of pyridine monocarboxylic acid bisulfate.

The process of the invention is made possible by my discovery of the surprising and unexpected behavior of nicotinic and isonicotinic acid bisulfates in sulfuric acid solutions.

As brought out above, when pyridine monocarboxylic acids, such as nicotinic acid, are dissolved in sulfuric acid, a "salt" or association complex of the pyridine carboxylic acid and sulfuric acid is formed in a mol ratio of 1:1. The formation of association complexes of heterocyclic nitrogen compounds with strong acids has long been known, and has been utilized, for example, in the separation of such compounds from petroleum. However, as far as I am aware, little or nothing has been known in the past as to the existence or properties of the pyridine carboxylic acid-sulfuric acid complexes. In general, complexes of this type are usually believed to be loosely associated combinations in which association and dissociation take place reversibly.

I have found, however, that the pyridine monocarboxylic acid bisulfates, nicotinic and isonicotinic acid bisulfates have surprising stability, unexpected in an association complex, such that when dissolved in sulfuric acid they may be separated therefrom substantially completely and without dissociation, by ordinary distillation methods. Thus, not only may 100% strength sulfuric acid be readily recovered from such solutions, but the nicotinic and isonicotinic acid bisulfate residues, have melting points such that they remain liquid in the still and can readily be removed therefrom for recovery of the nicotinic or isonicotinic acid by suitable means. Such a recovery process would be uneconomic if not impossible, if dissociation of the nicotinic or isonicotinic acid bisulfate at the temperatures of sulfuric acid distillation were to take place, causing complete distillation of combined as well as free sulfuric acid releasing free nicotinic or isonicotinic acid into the still either in the solid state, difficult to recover, or, if in the molten state, at temperatures at which it sublimes and decomposes.

I have also found that nicotinic and isonicotinic acids in the form of the nicotinic acid or isonicotinic bisulfate association complexes can safely be subjected to temperatures greatly above those at which the acid itself is decomposed, for considerable periods without significant decomposition or loss of the nicotinic or isonicotinic acid.

In carrying out the process according to my invention, substantially anhydrous mixtures of a pyridine monocarboxylic acid bisulfate, such as nicotinic or isonicotinic acid bisulfate, and sulfuric acid, which mixtures may contain impurities or catalyst materials such as selenium or the like, are subjected to distillation by any suitable method, for example by flash distillation at atmospheric pressures, by vacuum distillation, etc. Since some decomposition and loss of nicotinic acid may occur by prolonged exposure to high temperatures even when the nicotinic or isonicotinic acid is in the form of its bisulfate, I prefer to carry out the distillation under conditions in which time and/or temperature may be controlled so as to regulate them within limits within which no significant decomposition losses of nicotinic or isonicotinic acid occur.

Thus, if the distillation is carried out at atmospheric pressures, necessitating the use of temperatures at or above the normal boiling point of 100% sulfuric acid (330° C.), I prefer to limit the time of contact of the charge, for example by utilizing a "flash" distillation or other appropriate procedures well known in the art. In such procedures, temperatures of any individual portion of the charge may momentarily reach as high as about 400° C., particularly during the latter stages when the distillation of the free sulfuric acid nears completion, and as the time at such temperature is limited, no significant losses of nicotinic acid occur. In general, however, I prefer not to exceed about 400° C. and prefer to carry out atmospheric distillations between about 335° C. and about 400° C., and to limit the time of contact or residence time to not more than about ten minutes. At such temperatures and times of exposure losses of nicotinic or isonicotinic acid are not significant. Only upon prolonged exposures at the temperatures contemplated are significant losses of nicotinic or isonicotinic acid experienced. Thus, at 270° C., investigations have shown nicotinic acid (in the form of the bisulfate) to be stable substantially indefinitely even in high concentrations, e. g. at concentrations as high as 45% nicotinic acid by weight in sulfuric acid (the concentration being based on the total sulfuric acid present, both free, and combined as nicotinic acid bisulfate). In a 20% solution at 300° C., 8.4% of the nicotinic acid is decomposed in 47 hours, and in a 45% solution, 37.9% is decomposed after 47 hours. Decompositions of nicotinic acid occurring at higher temperatures in varying lengths of time are given in the table below.

TABLE I

*Stabilities of mixtures containing 20% nicotinic acid and 80% anhydrous sulfuric acid by weight, at various temperatures and times of exposure.*

| Temperature °C | 320 | 325 | 330 | 335 |
|---|---|---|---|---|
| Grams NA in Mixture originally | 431 | 434 | 432 | 443 |
| Grams NA lost in ½ hour | 3 | 4 | 12 | 14 |
| Grams NA lost in 3 hours | 7 | 10 | 38 | 41 |
| Percent loss per hour | 0.54 | 0.77 | 2.93 | 3.8 |

Thus, because of the resistance to dissociation of the nicotinic acid bisulfate, and the protecting effect of the associated sulfuric acid molecule on the tendency of nicotinic acid to decomposition, it is possible to remove sulfuric acid by distillation from mixtures thereof with nicotinic acid, to the extent of all but one mol of sulfuric acid per mol of nicotinic acid, which remains combined in the still as the nicotinic acid bisulfate complex, a liquid residue readily removed from the still for recovery therefrom of nicotinic acid by suitable means.

Instead of using a simple atmospheric distillation, vacuum distillation may be used, and the charge exposed for longer periods at the lower distillation temperatures thus afforded.

In carrying out the vacuum distillation according to my invention, the pyridine monocarboxylic acid bisulfate solution in virtually anhydrous sulfuric acid, which may contain impurities such as selenium or other catalyst material in the case of pyridine monocarboxylic acid oxidation masses as brought out above, is heated at liquid temperatures increasing from a low of, for example, 175° C. to a maximum of about 300° C. at reduced pressures of at least as low as about 50 mm. of mercury absolute at the start, to any conveniently attained lower pressure, for example 8 mm. mercury absolute at the end of the distillation; i. e. it is distilled to the point at which virtually all of the excess of sulfuric acid over that required to combine in an equimolecular ratio with the pyridine monocarboxylic acid as pyridine monocarboxylic acid bisulfate has distilled.

The pyridine monocarboxylic acid bisulfate remaining as a residue may be treated in any suitable manner for recovery of the pyridine monocarboxylic acid values therefrom, for example, by treating it at elevated temperature in the presence of a lower aliphatic alcohol with a quantity of anhydrous ammonia sufficient to combine with the sulfuric acid of the pyridine monocarboxylic acid bisulfate to form and precipitate alcohol insoluble ammonium sulfate, releasing the pyridine carboxylic acid which dissolves in the hot alcohol, whereupon the two phases are separated and the pyridine carboxylic acid is recovered from the alcohol solution.

The process of my invention is adapted for use with nicotinic or isonicotinic acid-sulfuric acid mixtures of any degree of relative concentrations, so long as an excess of sulfuric acid is present over that required to form the pyridine carboxylic acid bisulfate. It is primarily adapted for use with mixtures of nicotinic or isonicotinic acids in substantially water-free sulfuric acid, but the presence of water in the mixtures does not render the process inoperative, but merely requires that the water be removed as a preliminary to or during the high temperature distillation step.

Nicotinic acid-containing oxidation masses obtained by the sulfuric acid or mixed sulfuric-nitric acid oxidation of N-heteroaryl compounds usually contain between about 10% and about 30% nicotinic acid in substantially water-free sulfuric acid, i. e. usually between about 98% and about 101% sulfuric acid equivalent, although sulfuric acid concentrations (with respect to water) in some cases may run as low as 90%. When a selenium catalyst is used, it will usually be present in such oxidation masses in quantities between about 0.04% and about 0.12% by weight of the oxidation mass. The process of my invention is especially adapted for use with such mixtures.

The quantity of sulfuric acid recovered as the distillate usually amounts to from about 70% to about 80% by weight of the total sulfuric acid in the mixture; that is, from about 90% to 100% of the uncombined sulfuric acid is recovered.

The time consumed in carrying out the vacuum distillation will vary somewhat with the temperatures and pressures used, and should preferably be short enough so that no substantial decomposition of the pyridine carboxylic acid takes place, if subsequent complete recovery of such acid is to be effected. Lower pressures and higher temperatures within the limits specified will permit more rapid distillation. In general, distillation times not greater than about 3 hours at about 300° C. and about 45 mm. mercury absolute may be used without significant decomposition of pyridine carboxylic acid. At lower temperatures and pressures somewhat longer exposure times do no harm. Usually distillation will be complete in considerably shorter than the maximum allowable times for avoidance of decomposition, for example between about 20 minutes and about 60 minutes.

As pointed out above, the distillation process of my invention is particularly adapted for application to pyridine monocarboxylic acid oxidation masses containing selenium compounds used as catalyst in the oxidation process. Under conditions of the sulfuric acid distillation as practiced, selenium distills off first as a red liquid, i. e. as selenium dioxide dissolved in a small quantity of sulfuric acid. It is all cleanly removed early in the distillation, i. e. when the temperature reaches about 248° C., carrying with it only an extremely small amount of entrained sulfuric acid, leaving the remainder of the sulfuric acid pure and virtually uncontaminated. The selenium catalyst thus recovered may be separated from the sulfuric acid or may, preferably, be recycled to a subsequent oxidation step without separation of sulfuric acid. The concentrated sulfuric acid recovered may be added to the general stock of sulfuric acid for appropriate use or may be recycled to a subsequent oxidation step.

A major advantage of the process of the invention is that no aqueous dilution whatever of the substantially anhydrous sulfuric acid need be practiced at any stage of its separation from the pyridine carboxylic acid oxidation masses. A further advantage is the ease and simplicity and completeness of separation of contaminating selenium catalyst from such oxidation masses. A still further advantage, in the case of oxidation masses containing nicotinic acid produced by the oxidation of nitroquinoline, is that during the distillation process a major portion of any unreacted 8-nitroquinoline which may be present in the oxidation mass is converted to nicotinic acid, thus increasing the subsequent yield of the desired nicotinic acid product.

The following specific examples further illustrate my invention: Parts are by weight except as otherwise indicated.

*Example 1*

A solution of 25 parts of nicotinic acid in 100 parts of substantially anhydrous $H_2SO_4$ was placed in a distillation vessel and distilled at 1 mm. mercury absolute pressure at temperatures ranging from 176° C. at the start to a maximum of 248° C. for a period of 150 minutes until the molecular ratio of nicotinic acid to sulfuric acid in the residue was approximately 1:1. 81 parts of distillate were recovered corresponding to 81% of the total sulfuric acid, or 100% of the free sulfuric acid in the original charge, and 44 parts of a residue containing 43 parts nicotinic acid bisulfite equivalent to 24 parts of nicotinic acid or 95% of the nicotinic acid in the original charge. No charring or discoloration of the sulfuric acid occurred during distillation indicating absence of decomposition of nicotinic acid.

*Example 2*

894 parts of a nicotinic acid oxidation mass containing 190 parts (21.3%) by weight of nicotinic acid and 10.7 parts (1.2%) of 8-nitroquinoline dissolved in 693.3 parts (77.5%) of substantially water-free sulfuric acid together with about 0.45 part (0.05%) by weight (calculated as $SeO_2$) of selenium catalyst, was subjected to vacuum distillation in conventional distillation equipment. The distillation was initiated at a pressure of 50 mm. mercury absolute and a temperature of 240° C. The pressure was reduced gradually during the course of the distillation to 8 mm. mercury to maintain a steady distillation rate of between 1 and 2 parts by weight of distillate per minute while the temperatures increased to 280° C. The distillation proceeded smoothly, with the introduction of a stream of nitrogen to prevent bumping. An initial distillate consisting of 15 parts of a red liquid containing $SeO_2$ dissolved in sulfuric acid was taken during 20 minutes, until the liquid temperature had reached 248° C. and the vapor temperature was 214° C. at 45 mm. mercury. After 60 minutes, when the pressure had reached 15 mm. and the liquid temperature was 255° C., the vapor temperature 220°-225° C., 55% by weight of the total sulfuric acid in the charge had distilled. When the distillation pressure had dropped to 8 mm. mercury after an additional 60 minutes, with a liquid temperature of 275°-280° C. and a vapor temperature of 230° C., a total of 494 parts of anhydrous sulfuric acid had been recovered as distillate amounting to 70% by weight of the total sulfuric acid in the initial charge, 93.5% of the free acid in the charge. The total time consumed by the distillation was 180 minutes. The 400 parts of residue remaining contained 191 parts of nicotinic acid, 2.4 parts of 8-nitroquinoline, 206.6 parts of sulfuric acid, the constituents being combined as nicotinic acid bisulfate and 8-nitroquinoline bisulfate, together with a small amount of free sulfuric acid.

While the above describes the preferred embodiments of my invention, it will be understood that departures may be made therefrom within the scope of the specification and claims.

I claim:

1. A process for recovering sulfuric acid from substantially anhydrous mixtures thereof with pyridine monocarboxylic acid bisulfates selected from the group consisting of nicotinic and isonicotinic acid bisulfates, which comprises subjecting the mixture to distillation until substantially all the free sulfuric acid therein has distilled leaving the pyridine carboxylic acid bisulfate as the residue.

2. A process for recovering sulfuric acid from mixtures thereof with pyridine monocarboxylic acid bisulfates selected from the group consisting of nicotinic and isonicotinic acid bisulfates, which comprises subjecting the mixture to vacuum distillation at temperatures between about 175° C. and about 300° C.

3. A process for recovering sulfuric acid from mixtures thereof with pyridine monocarboxylic acid bisulfates selected from the group consisting of nicotinic and isonicotinic acid bisulfates, which comprises subjecting the mixture to vacuum distillation at temperatures between about 175° C. and about 300° C. and at pressures not in excess of about 50 mm. mercury absolute.

4. The process according to claim 2 wherein the pyridine monocarboxylic acid bisulfate is nicotinic acid bisulfate.

5. A process for recovering sulfuric acid from nicotinic acid oxidation masses containing at least about 10% nicotinic acid and an excess of sulfuric acid over that required to combine as the bisulfate with the nicotinic acid present, which comprises subjecting the oxidation mass to distillation until substantially all the free sulfuric acid has distilled leaving nicotinic acid bisulfate as the residue.

6. A process for recovering sulfuric acid from nicotinic acid oxidation masses containing at least about 10% of nicotinic acid, and an excess of sulfuric acid over that required to combine as the bisulfate with the nicotinic acid present, which comprises subjecting the oxidation mass to vacuum distillation at temperatures not in excess of about 300° C. until substantially all the free sulfuric acid has distilled leaving nicotinic acid bisulfate as the residue.

7. A process for recovering sulfuric acid from nicotinic acid oxidation masses containing at least about 10% of nicotinic acid, and an excess of sulfuric acid over that required to combine as the bisulfate with the nicotinic acid present, which comprises subjecting the oxidation mass to vacuum distillation at temperatures not in excess of about 300° C. for a period of not more than about 3 hours.

8. A process for recovering sulfuric acid from nicotinic acid oxidation masses containing at least about 10% of nicotinic acid, and an excess of sulfuric acid over that required to combine as the bisulfate with the nicotinic acid present, which comprises subjecting the oxidation mass to vacuum distillation at temperatures between about 175° C. and about 300° C., at pressures not in excess of about 50 mm. mercury absolute.

9. A process for recovering sulfuric acid from nicotinic acid oxidation masses containing between about 10% and about 30% nicotinic acid and an excess of sulfuric acid over that required to combine as the bisulfate with the nicotinic acid present, which comprises subjecting the oxidation mass to vacuum distillation at temperatures between about 175° C. and about 300° C., at pressures not in excess of about 50 mm. mercury absolute.

10. A process for recovering sulfuric acid, selenium catalyst and pyridine monocarboxylic acid bisulfate selected from the group consisting of nicotinic and isonicotinic acid bisulfates from mixtures thereof which comprises subjecting the mixture to distillation at temperatures up to about 248° C. until substantially all the selenium catalyst has distilled and thereafter continuing the distillation at higher temperatures until substantially all the free sulfuric acid has distilled leaving the pyridine carboxylic acid bisulfate as the residue.

11. A process for recovering sulfuric acid and selenium catalyst from mixtures thereof with pyridine monocarboxylic acid bisulfates selected from the group consisting of nicotinic and isonicotinic acid bisulfates, which comprises subjecting the mixture to vacuum distillation at temperatures up to about 248° C. until substantially all the selenium catalyst has distilled, and thereafter continuing the distillation at higher temperatures not in excess of about 300° C. until substantially all the free sulfuric acid has distilled.

12. A process for recovering sulfuric acid and selenium catalyst values from nicotinic acid oxidation masses containing between about 10% and about 30% nicotinic acid, and an excess of sulfuric acid over that required to combine as the bisulfate with the nicotinic acid present and between about 0.04% and about 0.12% of selenium calculated as selenium dioxide, which comprises subjecting the oxidation mass to vacuum distillation at temperatures between about 175° C. and about 248° C. and pressures between about 50 mm. mercury and about 40 mm. mercury, until substantially all the selenium in the oxidation mass has distilled, then gradually reducing the pressure to about 8 mm. mercury and raising the temperature to not more than about 300° C. until substantially all the free sulfuric acid in the initial charge has distilled.

13. A process for recovering sulfuric acid and selenium catalyst values from nicotinic acid oxidation masses containing between about 10% and about 30% nicotinic acid, and an excess of sulfuric acid over that required to combine as the bisulfate with the nicotinic acid present and between about 0.04% and about 0.12% of selenium calculated as selenium dioxide, which comprises subjecting the oxidation mass to vacuum distillation at temperatures between about 175° C. and about 248° C. and pressures between about 50 mm. mercury and about 40 mm. mercury, until substantially all the selenium in the oxidation mass has distilled, then gradually reducing the pressure to about 8 mm. mercury, raising the temperature to not more than about 300° C. until substantially all the free sulfuric acid in the initial charge has distilled, and recycling the recovered selenium dioxide and sulfuric acid to a subsequent nicotinic acid oxidation step.

14. A process for recovering sulfuric acid from substantially anhydrous mixtures thereof with pyridine monocarboxylic acid bisulfates selected from the group consisting of nicotinic and isonicotinic acid bisulfates, which comprises subjecting the mixture to distillation at atmospheric pressure at temperatures between about 335° C. and about 400° C. for contact times of not more than about ten minutes.

15. A process for recovering sulfuric acid from substantially anhydrous mixtures thereof with pyridine monocarboxylic acid bisulfates selected from the group consisting of nicotinic and isonicotinic acid bisulfates, said mixture containing at least about 10% of pyridine carboxylic acid bisulfate, which comprises subjecting the mixture to distillation until substantially all the free sulfuric acid therein has distilled leaving the pyridine carboxylic acid bisulfate as the residue.

RALPH W. DORNTE.

References Cited in the file of this patent
UNITED STATES PATENTS

| Number | Name | Date |
|---|---|---|
| 2,348,328 | Chapman | May 9, 1944 |
| 2,586,555 | Mueller | Feb. 19, 1952 |